United States Patent
Bottazzi

(10) Patent No.: US 9,435,877 B2
(45) Date of Patent: Sep. 6, 2016

(54) ULTRA-WIDEBAND LOCATION ENGINE FOR SELF-SHOPPING DEVICES

(71) Applicant: Datalogic IP Tech, S.r.l., Calderara di Reno (IT)

(72) Inventor: Marco Bottazzi, Ferrara (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 14/579,874

(22) Filed: Dec. 22, 2014

(65) Prior Publication Data

US 2016/0178727 A1 Jun. 23, 2016

(51) Int. Cl.
G01S 5/10 (2006.01)
H04B 1/69 (2011.01)

(52) U.S. Cl.
CPC .. *G01S 5/10* (2013.01); *H04B 1/69* (2013.01)

(58) Field of Classification Search
CPC ........ G01S 5/10; H04B 1/69; G06Q 10/087; G06Q 20/12; G06Q 20/3224; G08B 13/2402; G08B 13/2451; H04W 4/008; H04W 4/021
See application file for complete search history.

(56) References Cited

U.S. PATENT DOCUMENTS

| | | | |
|---|---|---|---|
| 7,154,396 B2 | 12/2006 | Reunamäki | |
| 7,375,634 B2 * | 5/2008 | Sprague | G06Q 10/047 340/572.1 |
| 8,188,841 B2 | 5/2012 | Dowla et al. | |
| 2006/0103533 A1 | 5/2006 | Pahlavan et al. | |
| 2008/0136644 A1 * | 6/2008 | McCorkle | 340/572.3 |
| 2010/0074306 A1 * | 3/2010 | Raza et al. | 375/140 |
| 2011/0050399 A1 | 3/2011 | Dardari | |
| 2011/0096764 A1 | 4/2011 | Tunioli et al. | |

(Continued)

FOREIGN PATENT DOCUMENTS

| | | |
|---|---|---|
| CN | 102355623 A | 2/2012 |
| WO | 2009/106964 A2 | 9/2009 |
| WO | 2011/153291 A2 | 12/2011 |

OTHER PUBLICATIONS

Chandrakasan et al., "Low-Power Impulse UWB Architectures and Circuits," *Proceedings of the IEEE* 97(2):332-352, Feb. 2009.

(Continued)

*Primary Examiner* — Hirdepal Singh
(74) *Attorney, Agent, or Firm* — Seed IP Law Group PLLC

(57) ABSTRACT

Real-time locating systems (RTLS) for self-shopping systems that utilize a dual technology approach. Self-shopping terminals are equipped with a passive or active ultra-wideband (UWB) tag that includes a UWB backscatter module or a UWB transmitter, respectively, as well as a standard wireless communication transceiver, such as a Wi-Fi® or UHF-RFID transceiver, that enables communication over the wireless communication channel. Readers fixed within a shopping environment activate the UWB tag of a selected one of the self-shopping terminals by addressing the self-shopping terminal using the standard wireless communication channel. Once activated, the UWB tag of the selected self-shopping terminal transmits UWB signals which are received by a plurality of the readers and used to determine the location of the UWB tag and hence the location of the self-shopping terminal. A messaging system may send messages to the self-shopping terminal for presentation to the customer on a display of the self-shopping terminal.

37 Claims, 8 Drawing Sheets

(56) References Cited

U.S. PATENT DOCUMENTS

| | | | | |
|---|---|---|---|---|
| 2011/0276382 | A1* | 11/2011 | Ramchandani et al. | 705/14.25 |
| 2012/0271715 | A1* | 10/2012 | Morton et al. | 705/14.53 |
| 2013/0187755 | A1* | 7/2013 | Rogers ............. G06Q 30/06 | 340/5.61 |
| 2014/0304351 | A1* | 10/2014 | Davis | 709/208 |
| 2014/0324627 | A1* | 10/2014 | Haver et al. | 705/26.9 |
| 2015/0006319 | A1* | 1/2015 | Thomas et al. | 705/26.8 |
| 2015/0039458 | A1* | 2/2015 | Reid ............. G06K 9/00335 | 705/26.1 |
| 2015/0051994 | A1* | 2/2015 | Ward ............. G06Q 30/0639 | 705/23 |
| 2015/0112790 | A1* | 4/2015 | Wolinsky ......... G06Q 30/0238 | 705/14.38 |
| 2015/0269818 | A1* | 9/2015 | Jain ............. G08B 13/248 | 340/572.1 |

OTHER PUBLICATIONS

Fernandes et al., "Recent Advances in IR-UWB Transceivers: An Overview," Proceedings of 2010 IEEE International Symposium on Circuits and Systems (ISCAS), Paris, France, May 30-Jun. 2, 2010, pp. 3284-3287.

Naik et al., "13. Intelligent Communication Module for Wireless Biosensor Networks," in *Biosensors,* InTech, Croatia, Feb. 2010, pp. 225-240.

Saeed et al., "Performance of Ultra-Wideband Time-of-Arrival Estimation Enhanced With Synchronization Scheme," *ECTI Transactions on Electrical Eng., Electronics, and Communications* 4(1):78-84, Feb. 2006.

International Search Report, mailed Mar. 24, 2016, for corresponding International Application No. PCT/US2015/067048, 5 pages.

\* cited by examiner

ULTRA-WIDEBAND LOCATION ENGINE FOR SELF-SHOPPING DEVICES

BACKGROUND

1. Technical Field

The present disclosure relates generally to retail environments, and more particularly to location determination systems and methods in retail environments.

2. Description of the Related Art

Retailers are constantly searching for new ways to enhance a customer's shopping experience, increase the customer's satisfaction and promote customer loyalty. Self-shopping enables retailers to introduce technology that improves sales and cuts costs by allowing customers to take charge of their own shopping and enjoy the experience. Self-shopping solutions enable shoppers to obtain the information they need without the help of a store associate by accessing in-store devices, displays and kiosks. In some instances, the customer may obtain this information directly on a custom mobile device or on their own personal device (e.g., smartphone) while the customer is inside or outside of the store.

Some of the offerings include applications that enable mobile shopping, product location, price confirmation, gift registry and self-checkout. All of this functionality may be accessible through an in-store communications system (e.g., Wi-Fi®, Bluetooth®), which allows shoppers to receive specific store or product information as well as in-store promotions.

One of the benefits of self-shopping is a fast checkout process which allows the customer to "pre-scan" the items they are purchasing with a portable device (such as a custom self-shopping device or a smartphone) before they approach the register. For example, customers may point a machine-readable symbol reader of a portable device at a product machine-readable symbol (e.g., barcode) and click on a button to scan the symbol, which then shows a description and the price of the product on a display of the portable device. While shopping, customers may also be able to check a list of all products previously scanned and may have access to an up-to-date total of their purchases, additional store offers, promotions and discounts. When a customer's shopping is completed, they simply go to the checkout and pay using self-payment kiosks without having to remove any of the merchandise from the cart or bag. This reduces waiting times considerably.

In self-shopping environments, it is often desirable to track the location of customers as they move through a store or shopping center. For example, it may be desirable to provide customers with directions to products, or to provide customers with information or promotions relating to products that are located nearby.

Generally, real-time locating systems (RTLS) may be used to automatically identify and track the location of customers in real time within a store or other shopping environment. By "real-time", it is meant that response times are within a predetermined time, and are negligible or within an acceptable tolerance with respect to the rate of change of the position of the items to be located. Wireless RTLS tags may be attached to objects (e.g., custom self-shopping devices, smartphones, tablet computers) or worn by customers and, in most RTLS, fixed reference points referred to as readers or anchor nodes receive wireless signals from tags to determine their location. The physical layer of RTLS technology is usually some form of radio frequency (RF) communication, but some systems use optical (e.g., infrared) or acoustic (e.g., ultrasound) technology instead of or in addition to RF.

Generally, available spatial location technologies are characterized by different performance factors, such as accuracy, range, passive/active behavior, etc. Each technology may have its own advantages and drawbacks that may match the requirements of a particular application.

In particular, Wi-Fi® based locating systems are suitable in asset management applications where a ranging accuracy of 4 to 5 meters is acceptable. Wi-Fi® based locating systems have an advantage in terms of infrastructure costs, as a Wi-Fi® network is normally already available and shared between many applications.

However, Wi-Fi® based locating systems may not be suitable as a location technology for self-shopping applications, in which there is a need for greater ranging accuracy (e.g., less than 1 meter) in determining the location of a self-shopping device or a portable device of the customer. For example, a "position aware" messaging system may need to send a consumer marketing information when the consumer is in front of the products being marketed.

BRIEF SUMMARY

A method of operation in a self-shopping platform including a plurality of readers fixedly positioned within an environment may be summarized as including selecting, by at least one processor, one of a plurality of self-shopping terminals associated with the self-shopping platform; sending, by the at least one processor, an activation command to the selected self-shopping terminal over a first wireless communication channel, the first wireless communication channel utilizing wireless signals other than ultra-wideband signals; in response to the sending of the activation command, receiving, by a plurality of reader processors of a respective plurality of readers, ultra-wideband signals from an ultra-wideband tag of the selected self-shopping terminal; and determining, by each of the plurality of reader processors of the respective plurality of readers which receive the ultra-wideband signals, a ranging value indicative of a distance between the self-shopping terminal and the respective reader using the received ultra-wideband signals. Selecting one of a plurality of self-shopping terminals associated with the self-shopping platform may include selecting an internet protocol (IP) address of one of the plurality of self-shopping terminals. Sending an activation command to the selected self-shopping terminal over a first wireless communication channel may include sending an activation command to the selected self-shopping terminal over at least one of an IEEE 802.11 communication channel or an ultra-high frequency radio frequency identification (UHF-RFID) communication channel. Receiving ultra-wideband signals from an ultra-wideband tag of the selected self-shopping terminal may include receiving ultra-wideband signals from an active ultra-wideband transmitter of the ultra-wideband tag. Receiving ultra-wideband signals from an ultra-wideband tag of the selected self-shopping terminal may include receiving ultra-wideband signals from an ultra-wideband backscatter circuit of the ultra-wideband tag. Receiving ultra-wideband signals from an ultra-wideband tag of the selected self-shopping terminal may include receiving code division multiple access (CDMA) ultra-wideband signals from an ultra-wideband tag of the selected self-shopping terminal. Receiving CDMA ultra-wideband signals from an ultra-wideband tag of the selected self-shopping terminal may include receiving CDMA ultra-wideband signals that use a balanced spreading code. Determining a ranging value indicative of a distance between the self-shopping terminal and the respective reader using the received ultra-wideband signals may include performing at least one of a time difference of arrival (TDOA) calculation or a time of arrival (TOA) calculation.

The method may further include determining, by the at least one processor of the self-shopping platform, at least a two-dimensional position of the self-shopping terminal based at least in part on the ranging values determined by each of the plurality of reader processors which received the ultra-wideband signals.

The method may further include selecting, by at least one processor, a message based at least in part on the determined position of the self-shopping terminal; and sending, by the at least one processor, the selected message to the self-shopping terminal over at least one data communication channel. Sending the selected message to the self-shopping terminal over at least one communication channel may include sending the selected message to the self-shopping terminal over the first wireless communication channel.

The method may further include sending, by each of the plurality of reader processors of the respective plurality of readers which receive the ultra-wideband signals, the determined ranging value to a processor-based locator system over at least one data communication channel.

A self-shopping system may be summarized as including a plurality of readers fixedly positioned within a shopping environment, each of the plurality of readers comprising: at least one reader processor; a first wireless communication transceiver communicatively coupled to the at least one reader processor, the wireless communications transceiver including a first transmitter that sends data over a first wireless communication channel and a first receiver that receives data over the first wireless communication channel, the first communication channel utilizing signals other than ultra-wideband signals; a second receiver communicatively coupled to the at least one reader processor, the second receiver receives ultra-wideband signals; and at least one nontransitory processor-readable medium communicatively coupled to the at least one reader processor and which stores at least one of processor-executable instructions or data that when executed by the at least one reader processor, cause the at least one reader processor to: send, by the first transmitter, an activation command to a selected one of a plurality of self-shopping terminals over the first wireless communication channel; receive, by the second receiver, ultra-wideband signals from an ultra-wideband tag of the selected self-shopping terminal; and determine a ranging value indicative of a distance between the self-shopping terminal and the respective reader using the received ultra-wideband signals. The at least one reader processor may select an internet protocol (IP) address of one of the plurality of self-shopping terminals. The at least one reader processor may send an activation command to the selected self-shopping terminal over at least one of an IEEE 802.11 communication channel or an ultra-high frequency radio frequency identification (UHF-RFID) communication channel. The at least one reader processor may receive, by the second receiver, ultra-wideband signals from an active ultra-wideband transmitter of the ultra-wideband tag. The at least one reader processor may receive, by the second receiver, ultra-wideband signals from an ultra-wideband backscatter circuit of the ultra-wideband tag. The at least one reader processor may receive code division multiple access (CDMA) ultra-wideband signals from an ultra-wideband tag of the selected self-shopping terminal. The CDMA ultra-wideband signals received from an ultra-wideband tag may include CDMA ultra-wideband signals that use a balanced spreading code. The at least one reader processor may perform at least one of a time difference of arrival (TDOA) calculation or a time of arrival (TOA) calculation.

The self-shopping system may further include a processor-based locator system communicatively coupled to the plurality of readers over at least one data communication channel; wherein the at least one reader processor of each of the plurality of readers sends the respective determined ranging value to the processor-based locator system over the at least one data communication channel. The processor-based locator system may determine at least a two-dimensional position of the self-shopping terminal based at least in part on the ranging values determined by each of the plurality of reader processors which received the ultra-wideband signals.

The self-shopping system may further include a processor-based messaging system that select a message based at least in part on the determined position of the self-shopping terminal, and sends the selected message to the self-shopping terminal over at least one data communication channel. The processor-based messaging system may send the selected message to the self-shopping terminal over the first wireless communication channel.

A method of operation in a self-shopping platform including a self-shopping terminal associated with a consumer having at least one processor, at least one wireless communications transceiver communicatively coupled to the at least one processor, at least one ultra-wideband tag communicatively coupled to the at least one processor, and at least one nontransitory processor-readable medium communicatively coupled to the at least one processor and which stores at least one of processor-executable instructions or data may be summarized as including receiving, by the at least one wireless communications transceiver of the self-shopping terminal, an activation command over a first wireless communication channel, the first wireless communication channel comprising at least one of an IEEE 802.11 communication channel or an ultra-high frequency radio frequency identification (UHF-RFID) communication channel; and in response to the received activation command, causing, by the at least one processor of the self-shopping terminal, a transmission of ultra-wideband signals by the ultra-wideband tag of the self-shopping terminal. Receiving an activation command may include receiving an activation command addressed to an internet protocol (IP) address of the self-shopping terminal. Causing a transmission of ultra-wideband signals by the ultra-wideband tag of the self-shopping terminal may include causing a transmission of ultra-wideband signals by an active ultra-wideband transmitter of the ultra-wideband tag. Causing a transmission of ultra-wideband signals by the ultra-wideband tag of the self-shopping terminal may include causing a transmission of ultra-wideband signals by an ultra-wideband backscatter circuit of the ultra-wideband tag. Causing a transmission of ultra-wideband signals by the ultra-wideband tag of the self-shopping terminal may include causing a transmission of code division multiple access (CDMA) ultra-wideband signals from the ultra-wideband tag of the self-shopping terminal. Causing a transmission of CDMA ultra-wideband signals by the ultra-wideband tag of the self-shopping terminal may include causing a transmission of CDMA ultra-wideband signals that use a balanced spreading code.

The method may further include receiving, by the at least one wireless communications transceiver of the self-shopping terminal, a marketing message from a processor-based messaging system over the first wireless communication channel. A self-shopping terminal may be summarized as including at least one processor; at least one wireless communications transceiver communicatively coupled to the at least one processor; at least one ultra-wideband tag communicatively coupled to the at least one processor; and at least one nontransitory processor-readable medium communicatively coupled to the at least one processor and which stores at least one of processor-executable instructions or data that when executed by the at least one processor, cause the at least one processor to: receive, by the at least one wireless communications transceiver, an activation command over a first wireless communication channel, the first wireless communication channel comprising at least one of an IEEE 802.11 communication channel or an ultra-high frequency radio frequency identification (UHF-RFID) communication channel; and in response to the received activation command, cause a transmission of ultra-wideband signals by the ultra-wideband tag of the self-shopping terminal. The at least one processor may receive, by the at least one wireless communications transceiver, an activation command addressed to an internet protocol (IP) address of the self-shopping terminal. The ultra-wideband tag may include an active ultra-wideband transmitter that transmits the ultra-wideband signals. The ultra-wideband tag may include an ultra-wideband backscatter circuit that transmits the ultra-wideband signals. The ultra-wideband tag may transmit code division multiple access (CDMA) ultra-wideband signals. The ultra-wideband tag may transmit code division multiple access (CDMA) ultra-wideband signals that use a balanced spreading code. The self-shopping terminal may include one of a smartphone, a tablet computer or a notebook computer. The at least one processor may receive, by the at least one wireless communications transceiver, a marketing message from a processor-based messaging system over the first wireless communication channel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
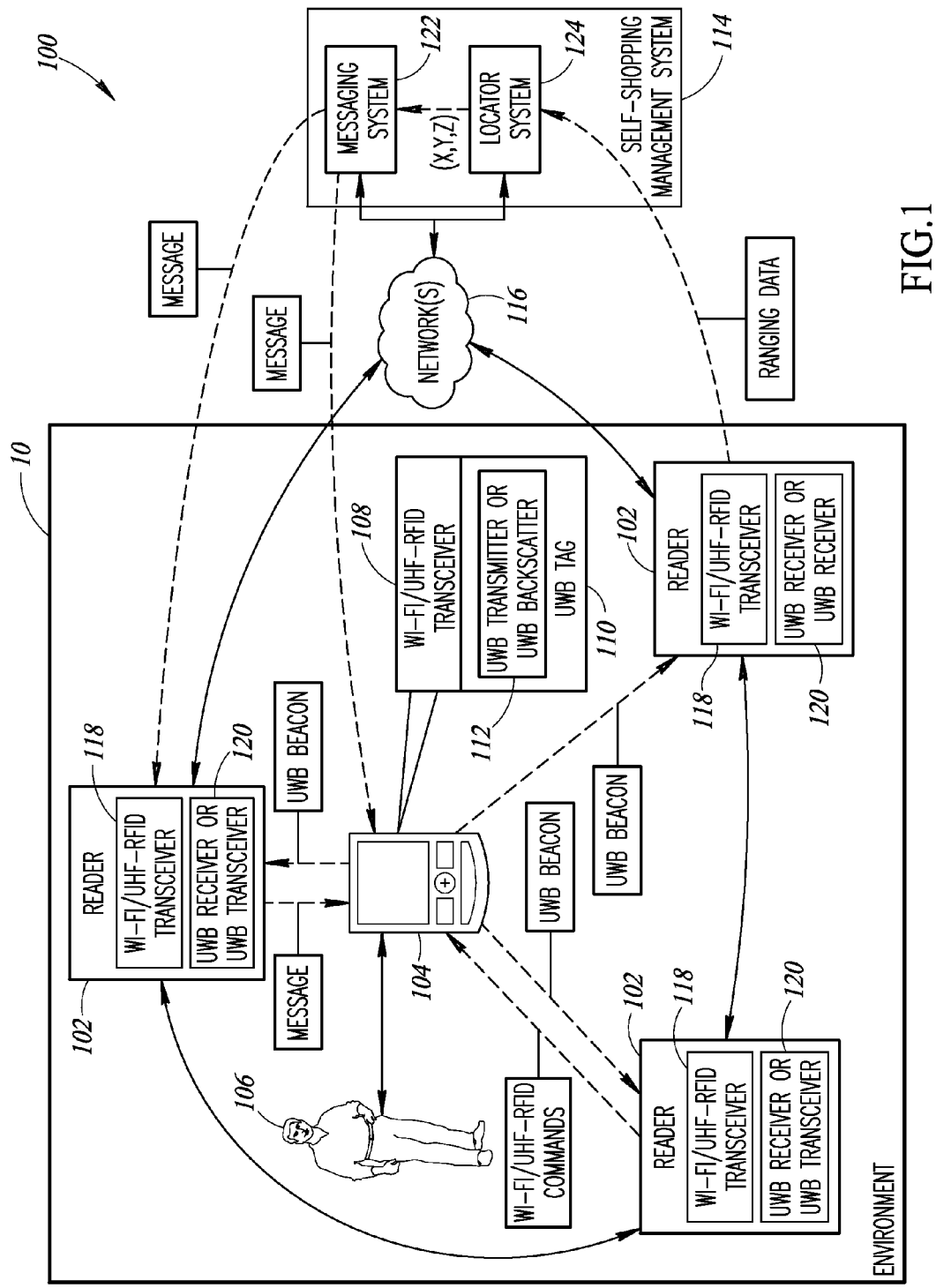
FIG. 1 is a schematic view of an environment in which a self-shopping system may operate, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

One or more implementations of the present disclosure relate to providing self-shopping management systems that accurately locate and track self-shopping terminals in a retail shopping environment (e.g., store) as the self-shopping terminals are moved by associated customers throughout the environment. Implementations of the present disclosure utilize ultra-wideband (UWB) technology in two different modes, active and passive, to locate the self-shopping terminals, while also utilizing standard wireless communication channels to minimize or reduce costs associated with the self-shopping terminals and readers of a self-shopping system. Moreover, implementations of the present disclosure provide at least two different technological solutions to overcoming a challenge with UWB locating systems, namely, the method by which a UWB tag in a self-shopping terminal is triggered or activated.

As used herein, the term "UWB tag" refers to the digital RF components that implement a ranging task in a self-shopping terminal or device. As used herein, the term "ranging" may refer to the measurement of the relative distance between a UWB tag and a reader (or "anchor node") that performs the measurement. Ranging data may include a distance value, an accuracy (e.g., estimation of error), and a precision (e.g., capability to preserve the accuracy over several repeated measurements). A reader or anchor node may be an RF digital device, placed with well-known coordinates, that drives the ranging operation using downlink and uplink communications.

Implementations of the present disclosure may include use of passive and active UWB tags. As used in this context, "passive" and "active" refer to the manner in which a ranging operation is performed, not to the way in which a UWB tag is powered. When a passive tag is used, the initiative in performing a ranging operation is the responsibility of the reader. In these implementations, the reader may first address a particular UWB tag (e.g., using a unique internet protocol (IP) address of the portable terminal that hosts the UWB TAG, as well as a Universal Identifier (UID) of a UHF-RFID Gen 2 UWB Tag), and second may transmit an inquiry message that the addressed UWB tag backscatters. When an active UWB tag is used, after activation by a reader, the UWB tag itself takes the initiative to transmit a series of beacon messages or frames, allowing ranging by the readers positioned proximate the UWB tag. Thus, an active UWB tag actively cooperates with the localization system whereas a passive UWB tag relies on the readers to perform the ranging operation.

As used herein, the term "downlink" refers to the logical operation by which a reader activates or triggers a ranging operation. The term "uplink" refers to the logical interaction between a UWB tag of a self-shopping terminal and a reader used to perform the ranging operation. Some implementations discussed herein make use of one of two different types of uplinks (active UWB and passive UWB) and one of two different types of downlinks (Wi-Fi® and UHF-RFID).

As used herein, an UWB transmission means a transmission from an antenna for which the emitted signal bandwidth exceeds the lesser of 500 MHz or 20% of the center frequency and complies with the FCC Power Spectrum Density upper limit of—41.3 DBm per Mhz. UWB systems in general employ very narrow (e.g., pico-second to nano-second) radio frequency (RF) pulses to transmit and receive information. The short duration of such UWB pulse and the particular shape of the pulses lead to very wide bandwidth (e.g., in the range of GHz), usually with a low power spectral density (PSD). Because of the low power spectral density, UWB pulses reside below the noise floor of a typical narrowband receiver. Therefore, UWB pulses are generally undetectable from background noise in most cases and only the intended receiver is able to detect them. The low PSD enables UWB signals to share the RF spectrum with, for example, radio services with minimal or no interference problems. Therefore, no expensive licensing of the spectrum is required by use of such UWB communication systems.

Furthermore, due to their large bandwidth and frequency diversity, the UWB pulses are less sensitive to multipath fading effects than narrow band based signals, and such UWB pulses can provide excellent time and spatial resolutions. Indeed, because the pulses are very short and have a very wide bandwidth, they have very sharp rising and falling edges, allowing the instant when they are received to be determined very accurately. This in turn allows the spatial resolution in a locating system to be very high, and allows the shortest path to be safely resolved against the other paths in a multipath environment.

FIG. 1 shows an example environment 10 for use in providing a self-shopping system 100. The environment 10 may be a store, shopping center, or other retail environment, for example. As illustrated in FIG. 1, the self-shopping system 100 includes a plurality of readers 102 (only three shown) and a self-shopping terminal or device 104 positioned in the environment. The self-shopping terminal 104 is associated with a customer 106, and may be the customer's own portable device (e.g., smartphone) or may be a custom self-shopping device. Although only one self-shopping terminal 104 is shown for clarity, it should be appreciated that in practice numerous self-shopping terminals may be present in the environment 10, such as when several customers are shopping simultaneously within the environment.

The self-shopping terminal 104 may move into, out of, and within the environment 10. The self-shopping system 100 operates to obtain and track the position of the self-shopping terminal 104 in substantially real-time as the customer 106 associated with the self-shopping terminal moves within the environment 10.

As shown in FIG. 1, the self-shopping terminal 104 includes at least one of a Wi-Fi® transceiver or an ultra-high frequency radio frequency identification (UHF-RFID) transceiver, either of which may be referred to herein as a wireless communications transceiver 108. The self-shopping terminal 104 may utilize the wireless communications transceiver 108 for various self-shopping operations, such as receiving or sending messages, sending scanning data, etc. The wireless communications transceiver 108 may in some implementations be compliant with any current IEEE 802.11 standard, or any future IEEE 802.11 standards.

The self-shopping terminal 104 also includes a UWB tag 110 which may in some implementations be an active UWB tag that includes a UWB transmitter, or in some implementations may be a passive UWB tag that includes a UWB backscatter module or circuit. The UWB transmitter or UWB backscatter module of the UWB tag 110 are labeled collectively as 112 in FIG. 1. It is noted that although described herein as separate components, in some implementations the UHF component, the UWB component, and/or other components discussed herein may be implemented as a single integrated circuit. Components of the self-shopping terminal 104 are discussed in detail below with reference to FIG. 2B.

The plurality of readers 102 may be communicatively coupled to each other and/or communicatively coupled to a self-shopping management system 114, such as by a wired and/or wireless communication network 116 (e.g., LAN, WAN, Internet, Worldwide Web, cellular network, Bluetooth®, WiFi®, NFC). Each of the readers 102 may include a wireless communications transceiver 118 operative to facilitate either or both of Wi-Fi® communications or UHF-RFID communications with other readers, with the self-shopping terminal 104, and/or with the self-shopping management system 114. Further, each of the readers 102 may include one of a UWB receiver or a UWB transceiver, collectively 120) that receives transmissions from the UWB tag 110 of the self-shopping terminal 104. As discussed further below, each of the readers 102 may include a UWB receiver for implementations where the self-shopping terminal 104 includes an active UWB tag, and each of the readers may include a UWB transceiver for implementations where the self-shopping terminal includes a passive UWB tag.

The management system 114 may include a messaging engine or system 122 that generates and sends messages to the self-shopping terminal 104. Such messages may include marketing information, directions, or other information.

The management system 114 also includes and a locator engine or system 124 that determines the location of the self-shopping terminal 104 and provides such location information to the messaging system 122 for use thereby to determine which messages to send to the customer 106 via the self-shopping terminal 104 or via another device or account associated with the customer. The locator system 124 as well as the messaging system 122 may be deployed in one or more local or remote dedicated computer systems or may be deployed in one or more cloud computer systems. Components of the management system 114 are discussed further below with reference to FIG. 2A.

The range or distance from the self-shopping terminal 104 to one of the readers 102 may be obtained by detection of the self-shopping terminal by the reader, which distance may be sent by the reader to the locator system 124 of the management system 114. The position of the self-shopping terminal 104 within the environment 10 may be computed by the locator system 124 from three distances from the self-shopping terminal to three readers, in the case of two-dimensional (2D) location determination, or from four such distances from the self-shopping terminal to four readers in the case of three-dimensional (3D) location determination within the environment. The locator system 124 may compute the location of the self-shopping terminal 104 by using known triangulation techniques or other advanced filtering techniques, such as Kalman filtering, particle filtering, etc. Thus, a 2D locator system will include at least three readers, and a 3D locator system will include at least four readers to determine a position of the self-shopping terminal.

The range or distance from the self-shopping terminal 104 to one reader 102 may be computed based on the propagation time or round-trip time of electromagnetic pulses traveling from a reader to the self-shopping terminal and/or vice versa. From the knowledge of the propagation speed of a pulse in the medium within environment 10, it is possible to translate the propagation time into a distance. In particular, an electromagnetic pulse propagates at the speed of light in the absence of obstacles, hence every 1 nanosecond an electromagnetic pulse covers about 0.3 meters. According to implementations of the present disclosure, the electromagnetic pulses used for computing the propagation time or round-trip time and hence the distances in the readers 102 or the locator system 124 are UWB pulses, realizing the benefits outlined above.

In implementations using an active UWB tag, the UWB transmitter may periodically send to the readers 102 a presence signal or "beacon." This signal may include preamble information (or header) and payload information, such as an ID of the UWB tag, and a timestamp. The beacon may be sent autonomously from the active UWB tag and collected by the readers 102.

In implementations using a passive or semi-passive UWB tag, the tag cannot autonomously transmit identification signals to the reader since the UWB tag does not include true transmission or reception equipment. A passive UWB tag may draw all energy required for operation from an interrogation signal coming from the reader 102, or from a dedicated device such as an energy harvesting system. A passive UWB tag may also have an internal battery or may receive power from a device in which it is placed, such as a self-shopping terminal, smartphone, etc.

In instances wherein the self-shopping terminal 104 is equipped with a passive UWB tag, communication from the UWB tag 110 to a reader 102 is accomplished by the backscatter module. When such a UWB tag 110 receives an interrogation signal coming from one of the readers 102, the backscatter module reflects omnidirectionally the signal coming from the reader. An antenna load impedance control circuit of the backscatter module may be used to add any desired modulation to the antenna reflections, so as to transmit preamble and payload information. A passive UWB tag may normally be off, and may be awakened by an awakening signal, or by the interrogation signal itself. The awakening signal may include a UHF continuous wave that provides the energy to the UWB tag.

In implementations wherein the self-shopping terminal 104 is equipped with a passive UWB tag, a time of arrival (TOA) algorithm may be used for ranging and may be implemented by using a round trip time evaluation. In implementations wherein the self-shopping terminal 104 is equipped with an active UWB tag, a time difference of arrival (TDOA) algorithm may be used. In some respects, TDOA provides an advantage over TOA, due to the fact that there is no need to synchronize tags and readers using TDOA, as is required for TOA. Anyway, that is to the singulation performed by reader behavior, it is possible to adopt in the passive UWB case special alternate and balanced codes that help to mitigate asynchronisms in the uplink communications.

In some implementations of the present disclosure, Code Division Multiple Access-Direct Sequence (CDMA-DS) is used for UWB communication within the environment 10. Systems using CDMA Frequency Hopping (CDMA-FH) and analogous techniques may also be used. Moreover, the present disclosure is not limited to CDMA techniques. In other implementations, instead of using CDMA techniques to access the communication channel, channel access methods such as Carrier Sense Multiple Access-Collision Avoidance (CSMA-CA) may be used, as per the standard IEEE 802.15.4.

CDMA-DS utilizes spreading codes, which are codes having such properties as to allow simultaneous access to a communication channel by uniquely identifying the transmitter, generating a spread spectrum signal, and offering the opportunity to de-spread the signal with a minimal level of mutual interference. In particular, an ideal spreading code is a sequence of bits for which the autocorrelation is maximal in the absence of shifts, and null in the presence of shifts, and the cross-correlation between different codes is always null. However, a code with these properties is merely ideal and, in practice, a spreading code should have properties as close as possible to the above. There are several types of spreading codes, including orthogonal codes and non-orthogonal codes, such as balanced codes (e.g., balanced Gold codes). Orthogonal codes require the readers 102 to be synchronized with the tags, while using non-orthogonal codes only the readers need to be synchronous with each other. As discussed further below, implementations of the present disclosure allow for every UWB tag in a self-shopping system to share the same spreading code, since each UWB tag is triggered individually (i.e., only one UWB tag is ranged at a time). Accordingly, implementations of the present disclosure may utilize balanced spreading codes (e.g., a sequence of 1's and 0's, 101010 . . . etc., that are orthogonal and are able to mitigate asynchronicity between a reader and a tag). Utilizing a balanced spreading code ensures that any DC component of the sequence can be neglected, as any code imbalance will be detected as unwanted peaks in the resulting spectrum, thus giving a clear indication of the code clock rate and mitigating asynchronicity issues.

Figure 2A:
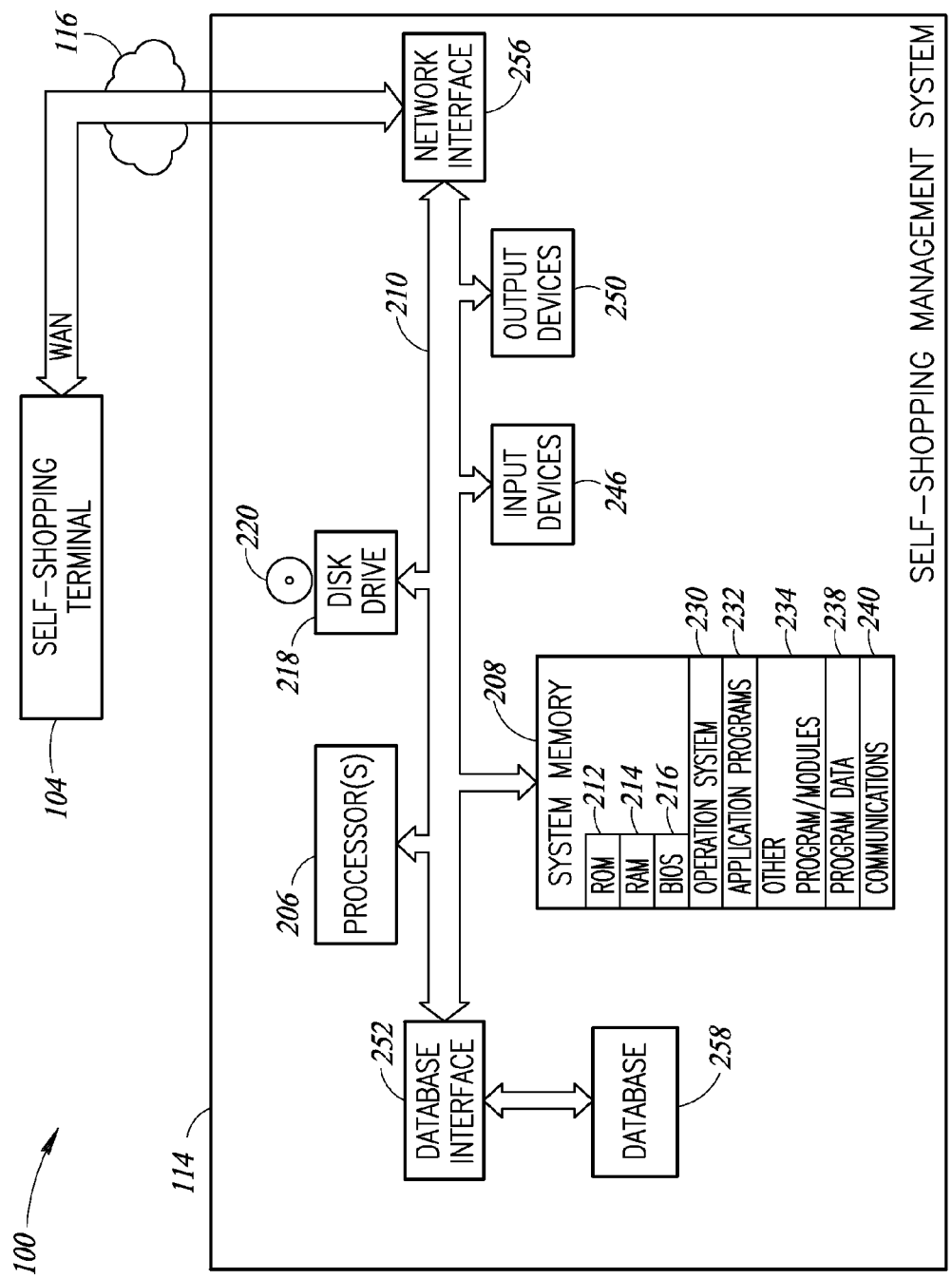
FIG. 2A is a functional block diagram of a self-shopping management system of the self-shopping system of FIG. 1, according to at least one illustrated embodiment.
Figure 2B:
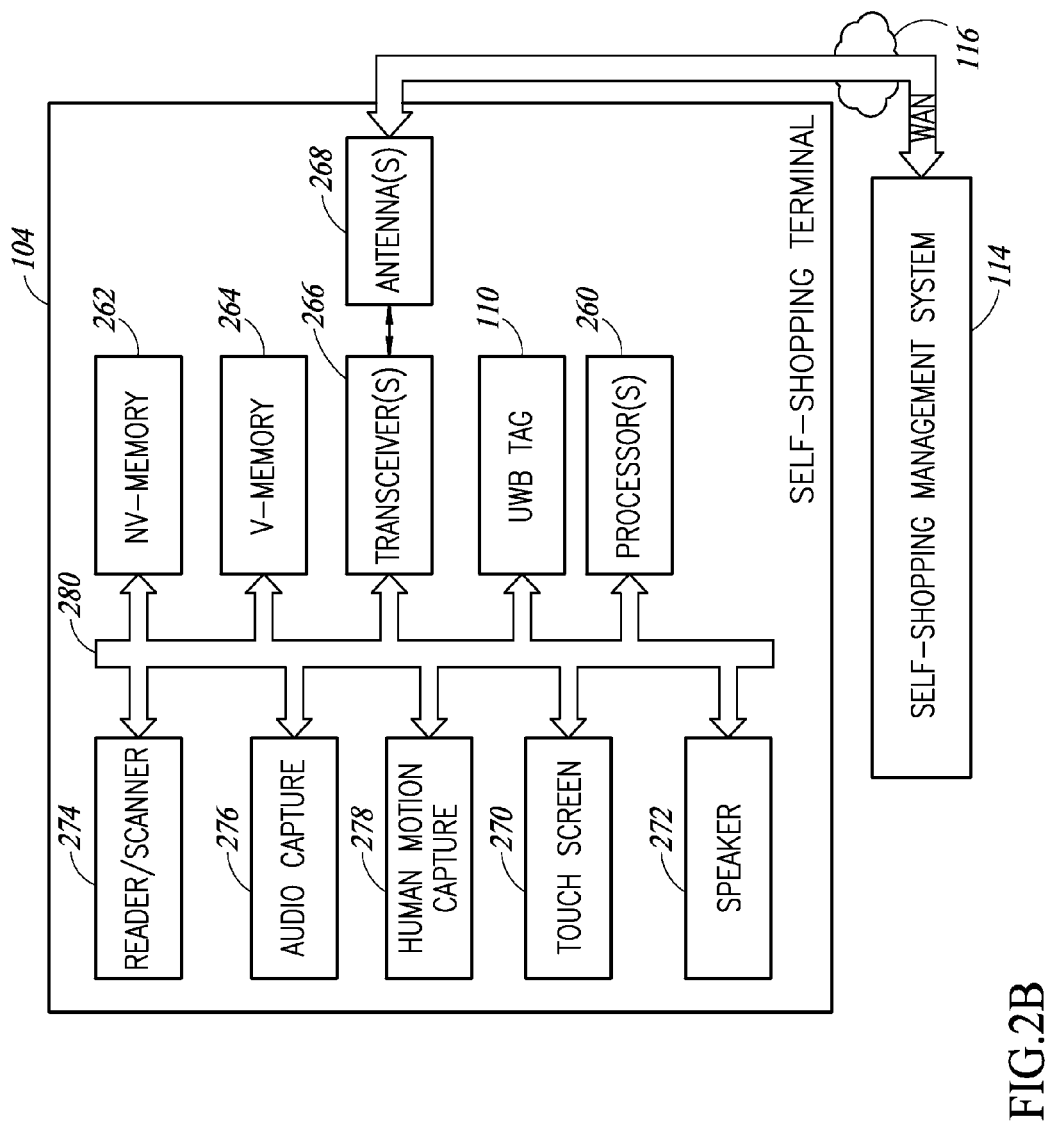
FIG. 2B is a functional block diagram of a self-shopping processor-based device or terminal of the self-shopping system of FIG. 1, according to at least one illustrated embodiment.

FIGS. 2A, 2B and the following discussion provide a brief, general description of the components forming the self-shopping system 100 including the self-shopping management system 114 and the self-shopping terminal 104 in which the various illustrated embodiments can be implemented. The self-shopping system 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The management system 114 may take the form of a PC, server, or other computing system executing logic or other machine executable instructions which may advantageously improve networked shopping systems. The management system 114 includes one or more processors 206, a system memory 208 and a system bus 210 that couples various system components including the system memory 208 to the processor 206. The management system 114 will at times be referred to in the singular herein, but this is not intended to limit the embodiments to a single system, since in certain embodiments, there will be more than one management system 114 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIGS. 2A and 2B are of conventional design. As a result, such blocks need not be described in further detail herein, as they will be understood by those skilled in the relevant art.

The system bus 210 can employ any known bus structures or architectures. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the management system 114, such as during start-up. Some embodiments may employ separate buses for data, instructions and power.

The management system 114 also may include one or more disk drives 218 for reading from and writing to one or more nontransitory computer- or processor-readable media 220 (e.g., hard disk, magnetic disk, optical disk, flash memory). The disk drive 218 may communicate with the processor 206 via the system bus 210. The disk drive 218 may include interfaces or controllers (not shown) coupled between such drives and the system bus 210, as is known by those skilled in the art. The drives 218 and their associated nontransitory computer- or processor-readable media 220 provide nonvolatile storage of computer-readable instructions, data structures, program modules and other data for the management system 114. Those skilled in the relevant art will appreciate that other types of computer-readable media may be employed to store data accessible by a computer.

Program modules can be stored in the system memory 208, such as an operating system 230, one or more application programs 232, other programs or modules 234, and program data 238.

The application program(s) 232 may include logic capable of providing the functionality described herein. For example, applications programs 232 may implement some or all of the components of the management system shown in FIG. 1, including the location system 124 and the messaging system 122.

The system memory 208 may include communications programs 240 that permit the management system 114 to access and exchange data with other networked systems or components, such as the self-shopping terminal 104, the readers 102 and/or other computing devices.

While shown in FIG. 2A as being stored in the system memory 208, the operating system 230, application programs 232, other programs/modules 234, program data 238 and communications programs 240 can be stored on the nontransitory computer- or processor-readable media 220 or other nontransitory computer- or processor-readable media.

Personnel can enter commands (e.g., system maintenance, upgrades, etc.) and information (e.g., parameters, equations, models, etc.) into the management system 114 using one or more communicably coupled input devices 246 such as a touch screen or keyboard, a pointing device such as a mouse, and/or a push button. Other input devices can include a microphone, joystick, game pad, tablet, scanner, biometric scanning device, gesture detection device, etc. These and other input devices may be connected to the processor(s) 206 through an interface such as a universal serial bus ("USB") interface that couples to the system bus 210, although other interfaces such as a parallel port, a game port or a wireless interface or a serial port may be used. One or more output devices 250, such as a monitor or other display device, may be coupled to the system bus 210 via a video interface, such as a video adapter. In at least some instances, the input devices 246 and the output devices 250 may be located proximate the management system 114, for example when the system is installed at the system user's premises. In other instances, the input devices 246 and the output devices 250 may be located remote from the management system 114, for example when the system is installed on the premises of a service provider.

In some implementations, the management system 114 uses one or more of the logical connections to optionally communicate with one or more remote computers, servers and/or other devices via one or more communications channels, for example, one or more networks 116. These logical connections may facilitate any known method of permitting computers to communicate, such as through one or more LANs, WLANs and/or WANs. Such networking environments are known in wired and wireless enterprise-wide computer networks, intranets, extranets, and the Internet.

In some implementations, a network port or interface 256, communicatively linked to the system bus 210, may be used for establishing and maintaining communications over the communications network 116. Further, a database interface 252, which is communicatively linked to the system bus 210, may be used for establishing communications with the nontransitory processor-readable storage medium or database 258, which may be a part of the management system 114 or at least in operative communication therewith. For example, the database 258 may include a repository for storing information regarding parameters, message information, marketing information, product information, etc. In some embodiments, the database interface 252 may communicate with the database 258 via the networks 116.

In the self-shopping system 100, program modules, application programs, or data, or portions thereof, can be stored in one or more computing systems. Those skilled in the relevant art will recognize that the network connections shown in FIGS. 2A and 2B are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network interface 256 and devices 246, 250 are illustrated as communicatively coupled to each other via the system bus 210, thereby providing connectivity between the above-described components. In alternative embodiments, the above-described components may be communicatively coupled in a different manner than illustrated in FIGS. 2A and 2B. For example, one or more of the above-described components may be directly coupled to other components, or may be coupled to each other, via intermediary components (not shown). In some embodiments, system bus 210 is omitted and the components are coupled directly to each other using suitable connections.

FIG. 2B shows various components of the self-shopping terminal 104 according to at least some implementations. The self-shopping terminal 104 may include any device, system or combination of systems and devices having at least wired or wireless communications capabilities. In many instances, the self-shopping terminal 104 includes additional devices, systems, or combinations of systems and devices capable of providing graphical data display capabilities. Examples of such self-shopping terminals 104 can include without limitation, custom self-shopping terminals, cellular telephones, smart phones, tablet computers, desktop computers, laptop computers, ultraportable or netbook computers, personal digital assistants, handheld devices, and the like.

The self-shopping terminal 104 may include one or more processors 260 and nontransitory computer- or processor-readable media or memory, for instance one or more non-volatile memories 262 such as read only memory (ROM) or FLASH memory and/or one or more volatile memories 264 such as random access memory (RAM).

The self-shopping terminal 104 may include one or more transceivers or radios 266 and associated antenna(s) 268. For example, the self-shopping terminal 104 may include one or more cellular transceivers or radios, one or more WiFi® transceivers or radios, one or more UHF-RFID transceivers or radios, and one or more BLUETOOTH® transceivers or radios, along with associated antennas. The self-shopping terminal 104 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

As discussed above, the self-shopping terminal 104 may also include the UWB tag 110 that includes one of a UWB transmitter or a UWB backscatter module. Components of the UWB tag 110 are discussed below with reference to FIG. 3.

The self-shopping terminal 104 may include a user input/output subsystem, for example including a touchscreen or touch sensitive display device 270 and one or more speakers 272. The touchscreen or touch sensitive display device 270 can include any type of touchscreen including, but not limited to, a resistive touchscreen or a capacitive touchscreen. The touchscreen or touch sensitive display device 270 may present a graphical user interface, for example in the form of a number of distinct screens or windows, which include prompts and/or fields for selection. The touchscreen or touch sensitive display device 270 may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example an alphanumeric keypad, a QWERTY keyboard, a joystick, scroll wheel, touchpad or similar physical or virtual input device.

The self-shopping terminal 104 may include one or more readers or scanners 274, for example, a machine-readable symbol reader or a camera with suitable lenses, and optionally one or more flash or lights for illuminating a field of view to capture images. The reader or scanner 274 may capture still digital images or moving or video digital images in some implementations. Captured information may be stored as files via the non-volatile memory 262, for example.

The self-shopping terminal 104 may include one or more audio capture devices 276, for example, microphones to capture audio such as speech or music. The self-shopping terminal 104 may also include a human motion capture device or component 278 that receives motions or gestures of the consumer as input.

Some or all of the components within the self-shopping terminal 104 may be communicably coupled using at least one bus 280 or similar structure adapted to transferring, transporting, or conveying data between the devices, systems, or components used within the self-shopping terminal 104. The bus 280 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 280.

The processor(s) 260 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 260, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 260 upon initial application of power. The processor(s) 260 may also execute one or more sets of logic or one or more machine executable instruction sets loaded from the volatile memory 264 subsequent to the initial application of power to the processor 260. The processor 260 may also include a system clock, a calendar, or similar time measurement devices.

The transceivers or radios 266 can include any device capable of transmitting and receiving communications via electromagnetic energy.

Non-limiting examples of cellular communications transceivers or radios 266 include a CDMA transceiver, a GSM transceiver, a 3 G transceiver, a 4 G transceiver, an LTE transceiver, and any similar current or future developed self-shopping terminal transceiver having at least one of a voice telephony capability or a data exchange capability. In at least some instances, the cellular transceivers or radios 266 can include more than one interface. For example, in some instances, the cellular transceivers or radios 266 can include at least one dedicated, full- or half-duplex, voice call interface and at least one dedicated data interface. In other instances, the cellular transceivers or radios 266 can include at least one integrated interface capable of contemporaneously accommodating both full- or half-duplex voice calls and data transfer.

Non-limiting examples of WiFi® transceivers or radios 266 include various chipsets available from Broadcom, including BCM43142, BCM4313, BCM94312MC, BCM4312, and chipsets available from Atmel, Marvell, or Redpine. Non-limiting examples of Bluetooth® transceivers or radios 266 include various chipsets available from Nordic Semiconductor, Texas Instruments, Cambridge Silicon Radio, Broadcom, and EM Microelectronic.

As noted, nontransitory computer- or processor-readable media can include non-volatile memory 262 and in some embodiments may include volatile memory 264 as well. At least a portion of the memory may be used to store one or more processor executable instruction sets for execution by the processor 260. In some embodiments, all or a portion of the memory may be disposed within the processor 260, for example in the form of a cache. In some embodiments, memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing applications or "apps" executable by the processor 260 may be stored in whole or in part in at least a portion of the memory 262, 264. In at least some instances, the applications may be downloaded or otherwise acquired by the end user, for example using an online marketplace such as the Apple App Store, Amazon Marketplace, or Google Play marketplaces. In some implementations, such applications may start up in response to selection of a corresponding user selectable icon by the user or consumer. The application can facilitate establishing a data link between the self-shopping terminal 104 and the interactive shopping management system via the transceivers or radios 266 and communication networks 116.

Figure 3:
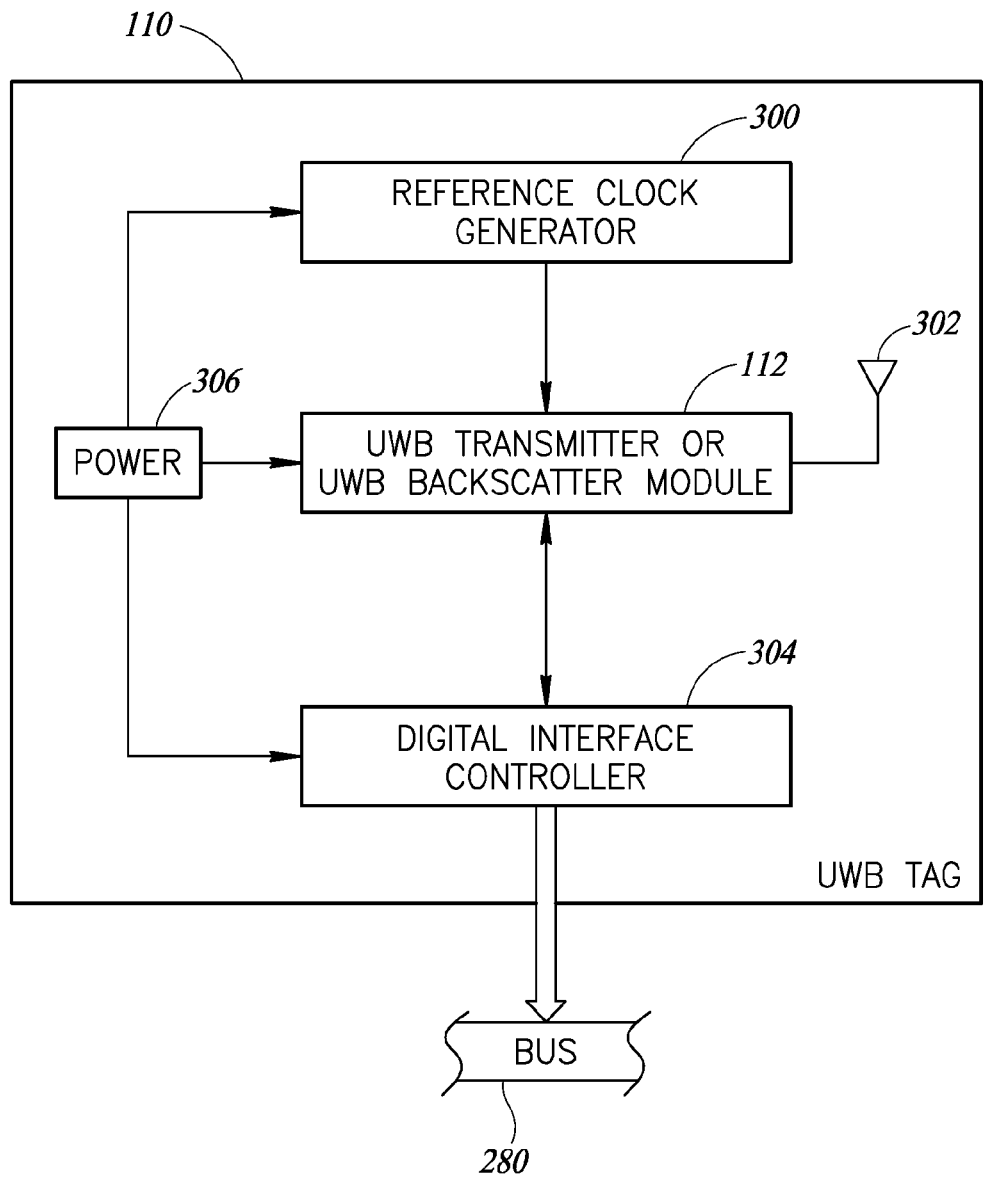
FIG. 3 is a functional block diagram of an ultra-wideband tag of the self-shopping processor-based device of FIG. 2B, according to at least one illustrated embodiment.

FIG. 3 is a functional block diagram of the UWB tag 110 of the self-shopping terminal 104 shown in FIG. 2B. The UWB tag 110 includes one of a UWB transmitter or a UWB backscatter module 112, each of which are able to transmit UWB signals to the readers for ranging operations. The components of the UWB transmitter are discussed below with reference to FIG. 4. The UWB tag 110 may include a reference clock generator 300 that supplies a clock signal to the UWB transmitter, which transmits UWB signals via an antenna 302, for example. The UWB tag 110 may also include a digital interface controller 304 (e.g., a Serial Peripheral Interface (SPI) controller) that facilitates communication with a host, such as the processor(s) 260 of the self-shopping terminal 104 (FIG. 2B). The UWB tag 110 may also include a power management module 306 that operates to supply power to the various components of the UWB tag. In some implementations, the power management module 306 may receive power from a power source of the host computer, for example, from a battery of the self-shopping terminal 104.

Figure 4:
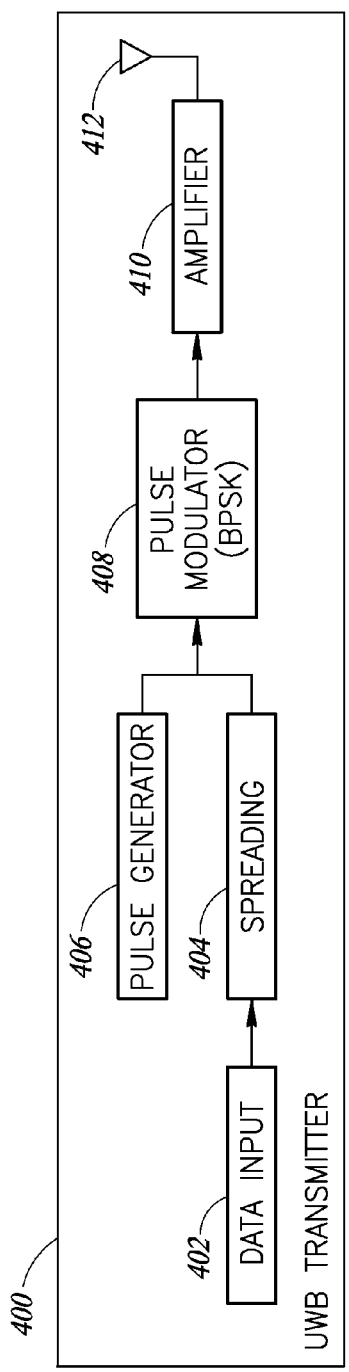
FIG. 4 is a functional block diagram of an ultra-wideband transmitter of the self-shopping processor-based device of FIG. 2B, according to at least one illustrated embodiment.

FIG. 4 is a functional block diagram of a UWB transmitter 400 that forms part of the UWB tag 110 in some implementations. Binary data input 402 to be transmitted is spread using a spreading sequence 404 (e.g., a pseudo random noise (PN) sequence) in order to provide system processing gain. The length N of the spreading code depends on the required processing gain. Any code can be used for spreading. One raw data bit is represented as 'N' bits of code individually known as a "chip." The entire spread data bit is referred to as a "symbol." Each chip in the symbol modulates a pulse from a pulse generator 406 using a binary phase shift keying (BPSK) modulator 408. These modulated pulses are repeated at a certain pulse repetition period (PRP) (e.g., PRP=128 ns). Then, the transmit frame amplified by an amplifier 410 and sent over the wireless channel via an antenna 412.

Figure 5:
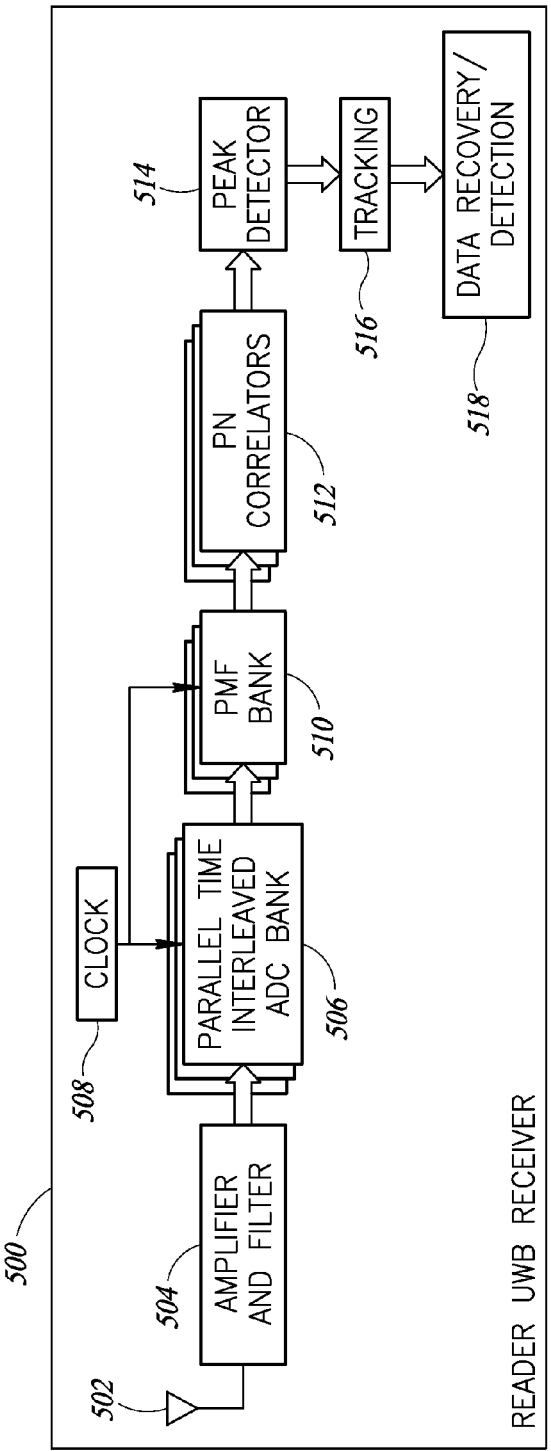
FIG. 5 is a functional block diagram of an ultra-wideband receiver of a reader of FIG. 1, according to at least one illustrated embodiment.

FIG. 5 is a functional block diagram of a UWB receiver 500 of the readers 102 shown in FIG. 1. An analog frontend of the receiver 500 includes an antenna 502, and an amplifier and filter 504 which receives and amplifies the signal, and which suppresses interferences (e.g., interferences in the mobile phone band around 900 MHz, frequency modulation (FM) radios and Very High Frequency (VHF) television signals below 110 MHz). A bank of parallel, time-interleaved analog-to-digital converters (ADCs) 506 sample the received signal at an effective sampling rate of 2 GHz. In some implementations, the bank of ADCs 506 may include 32 parallel ADCs, each sampling the received signal at 62.5 MHz to provide an effective sampling rate of approximately 2 GHz.

A clock generation module 508, a bank of parallel digital pulse matched filters (PMFs) 510, a bank of parallel pseudo noise correlators (PNCs) 512, a peak detector 514, local PN generator or tracker 516, and a data recovery and control block 518 together constitute a digital backend of the UWB receiver 500 of the readers 102. The digital backend employs the bank of PMFs 510 and PNCs 512 to perform acquisition and synchronization operations followed by tracking and data detection operations. The resulting detected data may then be stored in a memory of the UWB receiver 500 or a memory of the reader 102 in which the UWB receiver is implemented.

Figure 6:
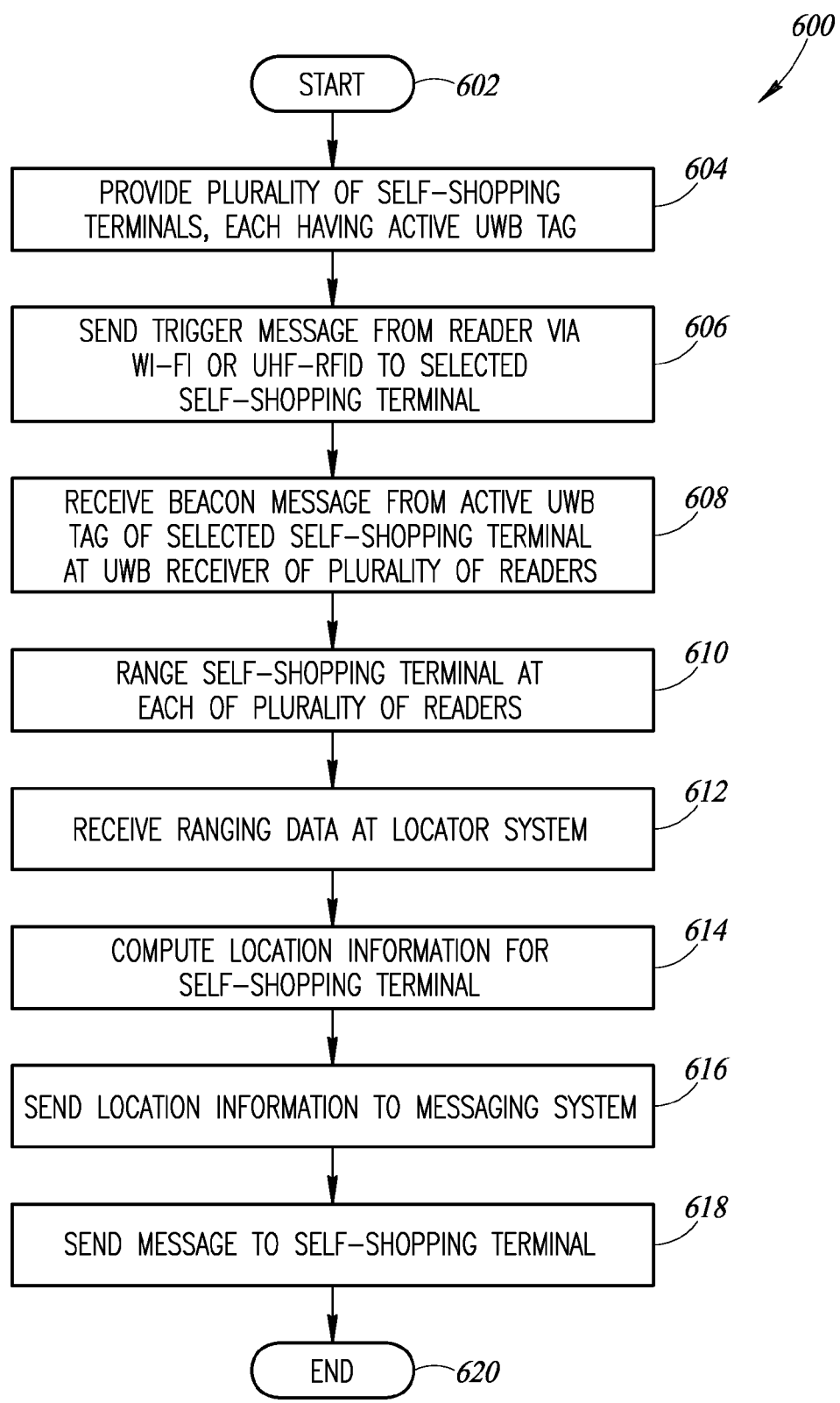
FIG. 6 is a flow diagram showing a method of operation of a self-shopping system to determine a location of a self-shopping terminal, wherein the self-shopping terminal includes an active ultra-wideband tag, according to at least one illustrated embodiment.

FIG. 6 shows a flow diagram for a method 600 of operating a self-shopping system, such as the self-shopping system 100 of FIG. 1. Notably, the approach described herein provides an improved self-shopping system that permits highly accurate determinations of the location of self-shopping terminals within a retail environment while not significantly increasing costs.

The method 600 starts at 602. For example, the method 600 may start when a customer carries a self-shopping terminal, such as the self-shopping terminal 104 of FIG. 1, into a shopping environment. The shopping environment may include a plurality of fixed readers positioned at various locations throughout the environment. In this implementation, the readers may include a UWB receiver (see FIG. 5), but may not include a potentially costly and complex UWB transmitter since one is not required to implement the method 600.

At 604, one or more customers are provided with a plurality of corresponding self-shopping terminals that each include an active UWB tag which includes a UWB transmitter. In some implementations, the UWB tag does not include or require a UWB receiver, which may reduce the cost and complexity of the UWB tag and the self-shopping terminal in which it is placed. The UWB transmitter may be normally turned off but may be switched on by a software component executing over a Wi-Fi® or UHF-RFID based internet protocol (IP) channel link as a response to a command from a reader, such as one of the readers 102 of FIG. 1. The UWB tag may be addressable by the readers or a locator system (e.g., the locator system 124 of FIG. 1) by an IP address, for example.

At 606, a reader of the self-shopping system may send a unicast trigger message to a selected one of the self-shopping terminals via a Wi-Fi® or UHF-RFID channel. As noted above, the reader may address a selected one of the self-shopping terminals using an IP address of the terminal itself (or the UID of the UHF Tag) tag or of the self-shopping terminal for singulation. In many implementations, the Wi-Fi® or UHF-RFID channels may be used as a normal communications path for various other applications associated with the self-shopping system, such as a messaging application.

At 608, a plurality of readers proximate the selected self-shopping terminal may receive at respective UWB receivers thereof a UWB beacon message transmitted by the UWB transmitter of the active UWB tag of the self-shopping terminal. A purpose of the UWB beacon message is to permit the UWB tag, and therefore the self-shopping terminal, to be ranged and localized by at least three readers for 2D localization, or by at least four readers for 3D localization. As discussed more below, a specialized UWB modulation schema may be adopted to implement the ranging operations.

At 610, each of the readers that received a beacon message from the selected self-shopping terminal may range the self-shopping terminal. For example, each of the readers may utilize a time difference of arrival (TDOA) algorithm to range the self-shopping terminal.

At 612, the locator system of the self-shopping management system receives ranging data from the plurality of readers over one or more wired or wireless data communication channels (e.g., network 116 of FIG. 1).

At 614, the locator system computes the coordinates of the self-shopping terminal by applying one or more location algorithms (e.g., TDOA) and/or fingerprinting algorithms to evaluate the 2D or 3D position of the self-shopping terminal.

At 616, the locator system may send the determined location information (e.g., coordinates) of the self-shopping terminal to the messaging system of the self-shopping management system.

At 618, the messaging system may cause relevant information to be sent to the self-shopping terminal for presentation to the customer thereby based at least in part on the location information received from the locator system. For example, the messaging system may recognize that a customer is near a particular product, and may send an advertisement or coupon relating to the product to the self-shopping terminal for presentation to the customer on a display of the self-shopping terminal.

The method 600 ends at 620 until started or invoked again. For example, the method 600 may be invoked from time-to-time or substantially continuously as a customer associated with a self-shopping device moves about the shopping environment. The method 600 may also be repeated for different ones of the self-shopping terminals located within or near a shopping environment.

As noted above, the UWB impulse radio (IR) digital modulation schema may be based on CDMA technology. Advantageously, all of the UWB tags may use the same spreading code because the UWB tags are triggered individually (i.e., only one UWB tag is ranged at time by the readers). This leads to a significant cost reduction, as there is no need of parallelism in the baseband controller.

Additionally, in the implementation discussed above, the UWB tag includes an UWB IR transmitter and not a backscatter module, which allows for an important improvement in the transmission range of the UWB tag, although with a small cost penalty.

It should be appreciated that the adoption of a standard IEEE 802.11 A/b/g/n Wi-Fi® channel with a TCP/IP protocol stack or a standard UHF-RFID channel eliminates the need for a UWB receiver on the UWB tag as well as the need for a UWB transmitter on the readers. Thus, the implementations of the method 600 provide accurate position estimation (e.g., within 30 cm) by using UWB technology, while allowing for low cost UWB tags which do not require a UWB receiver and low cost readers which do not require a UWB transmitter.

Figure 7:
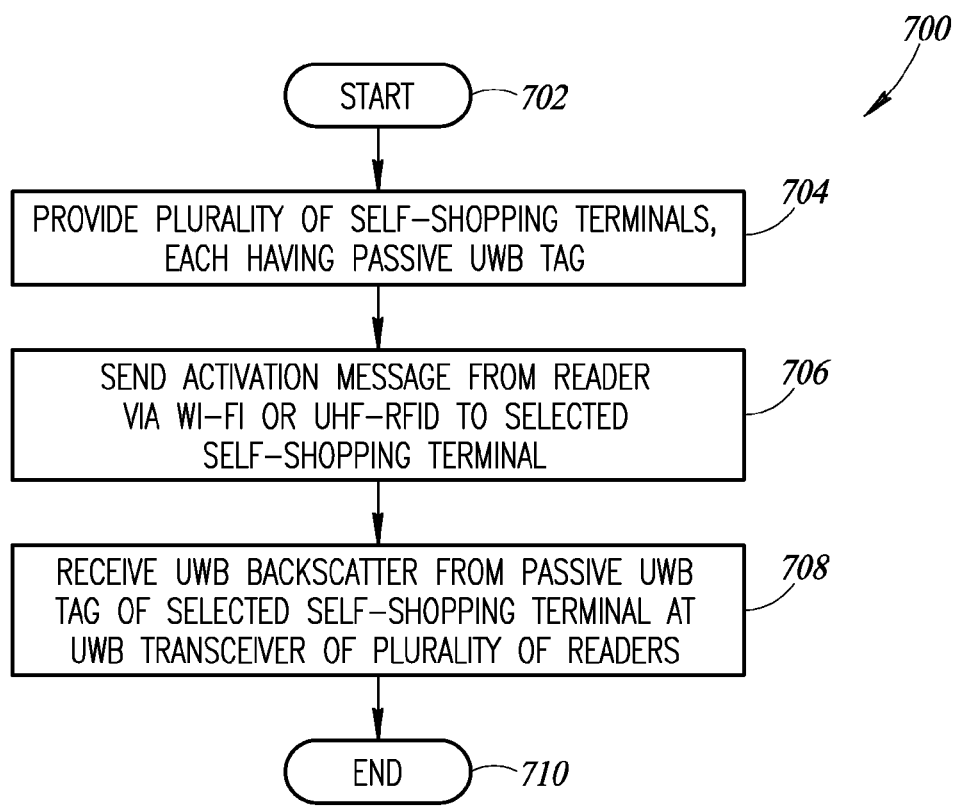
FIG. 7 is a flow diagram showing a method of operation of a self-shopping system to determine a location of a self-shopping terminal, wherein the self-shopping terminal includes a passive ultra-wideband tag, according to at least one illustrated embodiment.

FIG. 7 shows a flow diagram for a method 700 of operating a self-shopping system, such as the self-shopping system 100 of FIG. 1. The method 700 is similar to the method 600 in several aspects, so only differences between the two methods are discussed below for brevity. In this implementation, the readers may include a UWB half-duplex transceiver, and may be able to detect, range, and localize UWB tags. The method starts at 702.

At 704, one or more customers are provided with a plurality of corresponding self-shopping terminals that each include a passive UWB tag which includes a UWB backscatter module or circuit. In some implementations, the UWB tag does not include or require a UWB receiver or an active UWB transmitter, which may reduce the cost and complexity of the UWB tag and the self-shopping terminal in which it is placed. The UWB backscatter module may normally be turned off but may be switched on by a software component executing over a Wi-Fi® or UHF-RFID based IP channel link as a response to a command from a reader, such as one of the readers 102 of FIG. 1. The UWB tag may be addressable by the readers or a locator system (e.g., the locator system 124 of FIG. 1) by an IP address, for example.

At 706, a reader of the self-shopping system may send a unicast trigger message to a selected one of the self-shopping terminals via a Wi-Fi® or UHF-RFID channel, which causes the backscatter module to start to reflect or backscatter. As noted above, the reader may address a selected one of the self-shopping terminals using an IP address of the UWB tag or of the self-shopping terminal for singulation. In many implementations, the Wi-Fi® or UHF-RFID channels may be used as a normal communications path for various other applications associated with the self-shopping system, such as a messaging application.

At 708, a plurality of readers proximate the selected self-shopping terminal may receive at respective UWB receivers thereof a backscatter signal transmitted by the UWB backscatter module of the passive UWB tag of the self-shopping terminal. The backscatter signal permits the UWB tag, and therefore the self-shopping terminal, to be ranged and localized by at least three readers for 2D localization, or by at least four readers for 3D localization.

Similar to the method 600 discussed above, once the readers have received the backscatter signal from the UWB backscatter module of the UWB tag, the readers may range the UWB tag and send the ranging data to the locator system. Since the UWB tag is passive in this implementation, the readers may range the UWB tag using a time of arrival (TOA) algorithm, for example. The locator system may then localize the UWB tag and send the determined location information to the messaging system for use thereby to send suitable messages to the customer.

Relative to the implementations discussed with reference to the method 600, in the implementations of method 700 the transmission range of the UWB tag is lower due to the absence of an active UWB transmitter but the cost and complexity of the UWB tag is also lower.

As noted above, in some implementations a standard UHF-RFID communication channel may be used instead of a Wi-Fi® channel. Moreover, the techniques discussed here may be applied to other applications in which a standard wireless communications channel, such as Wi-Fi® or UHF-RFID is present and available.

Figure 8:
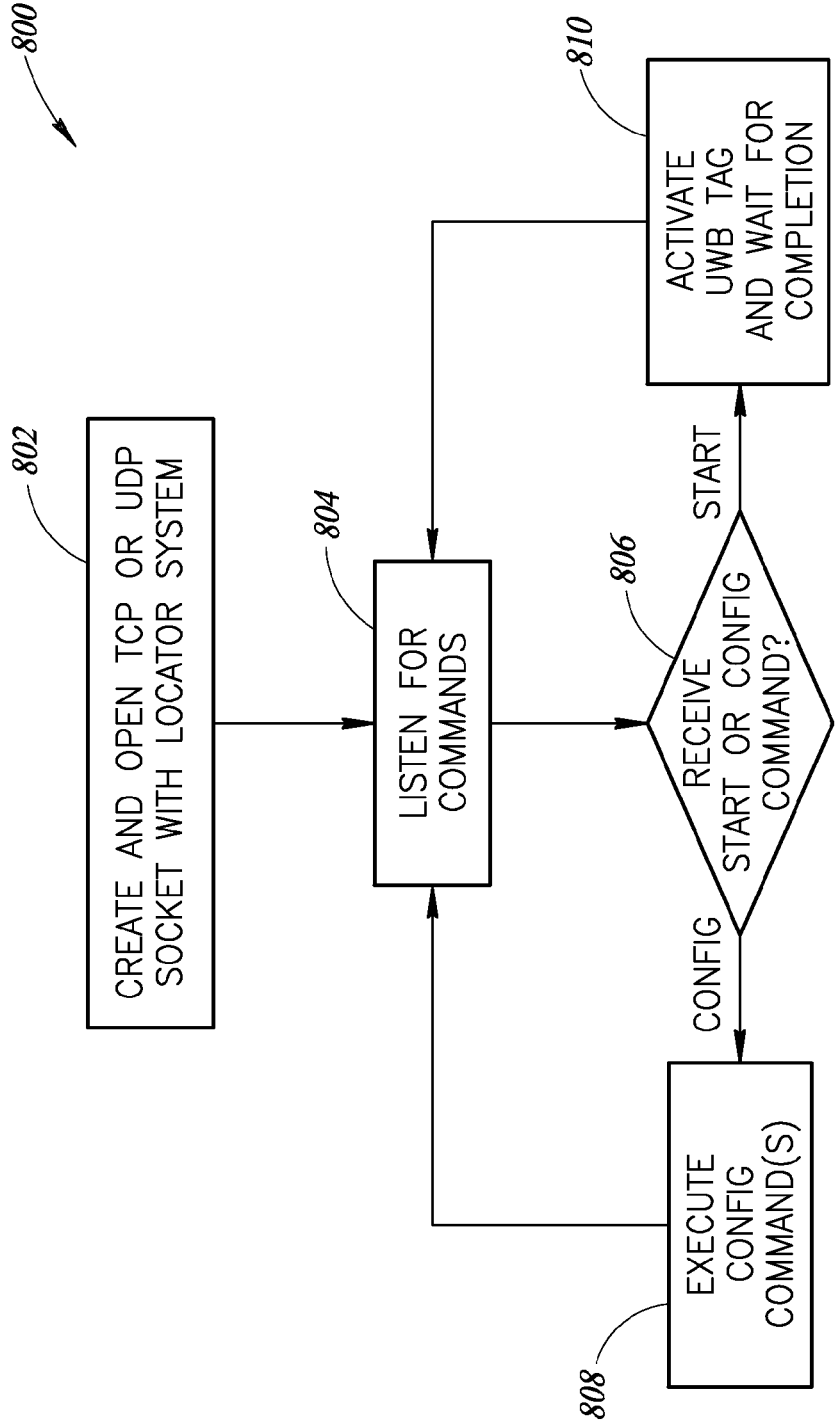
FIG. 8 is a flow diagram showing a method of operation of a self-shopping terminal to provide location information to a plurality of readers of a self-shopping system, according to at least one illustrated embodiment.

FIG. 8 shows a flow diagram for a method 800 of operation of a self-shopping terminal to provide data used for ranging to a plurality of readers of a self-shopping system, such as the self-shopping system 100 of FIG. 1. The method 800 may be implemented while a self-shopping terminal is positioned within a shopping environment, such as the environment 10 of FIG. 1.

At 802, a processor of the self-shopping terminal (e.g., processor(s) 260 of FIG. 2B) creates and opens a TCP or UDP socket with a locator system of the self-shopping management system.

At 804, the processor may dedicate a parallel thread to listen for location control commands (e.g., "start" command) or configuration commands received from one of the readers or from the location system while the processor also performs normal operations for the self-shopping terminal, such as scanning operations, messaging operations, etc.

At 806, after receiving a command, the processor may determine whether the command is a start command or a configuration command. At 808, if the processor determines the received command is a configuration command, the processor may execute such configuration command. Non-limiting examples of configuration commands may include the spreading code to use by the UWB tag, the number of UWB pulses to use to represent a signal, or any user defined parameters.

At 810, if the processor determines the received command is a start command, the processor activates the UWB tag causing the UWB to transmit beacon messages (or backscatter) and waits for completion of ranging operation.

As noted above, in some implementations, UWB ranging operations are accomplished using very short pulses modulated following a code modulation schema (e.g., CDMA). In some implementations, such as the implementations discussed above with reference to the method 700 in which the UWB tags include passive backscatter modules, it may be beneficial to use a spread signal is a balanced sequence (i.e., equal number of "0" and "1") to be able at the UWB receivers to cut the effect of multipath. In fact, jitter between the transmitter and receiver clock, as well as the need to know in advance the spreading code value, make the implementation of an UWB receiver device a difficult and cost sensitive task. This is even more amplified by the need to synchronize the readers cooperating on the same area of location that shall operate following the TDOA location method in the implementation of the method 600 or worse, in the TOA method of the implementation of the method 700.

Accordingly, implementations of the present disclosure provide a real-time locating system for a self-shopping system that utilizes a dual technology approach, UWB technology for the location function (uplink) and Wi-Fi® (or UHF-RFID) for the trigger or activation function (downlink). The downlink channel may also be used to implement the singulation of the UWB tag, which allows for a substantial simplification of the UWB components as well as reduces the costs associated with the UWB components. Further, by implementing singulation of the UWB tag at the reader using, for example, an IP address of the UWB tag, special balanced spreading codes may be used which mitigate the lack of synchronization between readers and UWB tags.

Thus, the implementations discussed herein take full advantage of the high accuracy location determination capabilities of UWB technology while minimizing added costs to a system. The implementations of the present disclosure are useful in self-shopping applications, in which the Wi-Fi® communication is present by definition. Further, self-shopping terminals are powered by a battery that may also be used to power the UWB tag, and in self-shopping applications, it does not present an issue to locate only a single self-shopping terminal at time.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, and U.S. patent applications referred to in this specification and/or listed in the Application Data Sheet are incorporated herein by reference in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a self-shopping platform including a plurality of readers fixedly positioned within an environment, the method comprising:
   selecting, by at least one processor, one of a plurality of self-shopping terminals associated with the self-shopping platform;
   sending, by the at least one processor, an activation command to the selected self-shopping terminal over a first wireless communication channel, the first wireless communication channel utilizing wireless signals other than ultra-wideband signals;
   in response to the sending of the activation command, receiving, by a plurality of reader processors of a respective plurality of readers, ultra-wideband signals from an ultra-wideband tag of the selected self-shopping terminal;
   determining, by each of the plurality of reader processors of the respective plurality of readers which receive the ultra-wideband signals, a ranging value indicative of a distance between the self-shopping terminal and the respective reader using the received ultra-wideband signals; and
   sending, by each of the plurality of reader processors of the respective plurality of readers which receive the ultra-wideband signals, the determined ranging value to a processor-based locator system over at least one data communication channel.

2. The method of claim 1 wherein selecting one of a plurality of self-shopping terminals associated with the self-shopping platform comprises selecting an internet protocol (IP) address of one of the plurality of self-shopping terminals.

3. The method of claim 1 wherein sending an activation command to the selected self-shopping terminal over a first wireless communication channel comprises sending an activation command to the selected self-shopping terminal over at least one of an IEEE 802.11 communication channel or an ultra-high frequency radio frequency identification (UHF-RFID) communication channel.

4. The method of claim 1 wherein receiving ultra-wideband signals from an ultra-wideband tag of the selected self-shopping terminal comprises receiving ultra-wideband signals from an active ultra-wideband transmitter of the ultra-wideband tag.

5. The method of claim 1 wherein receiving ultra-wideband signals from an ultra-wideband tag of the selected self-shopping terminal comprises receiving ultra-wideband signals from an ultra-wideband backscatter circuit of the ultra-wideband tag.

6. The method of claim 1 wherein receiving ultra-wideband signals from an ultra-wideband tag of the selected self-shopping terminal comprises receiving code division multiple access (CDMA) ultra-wideband signals from an ultra-wideband tag of the selected self-shopping terminal.

7. The method of claim 6 wherein receiving CDMA ultra-wideband signals from an ultra-wideband tag of the selected self-shopping terminal comprises receiving CDMA ultra-wideband signals that use a balanced spreading code.

8. The method of claim 1 wherein determining a ranging value indicative of a distance between the self-shopping terminal and the respective reader using the received ultra-wideband signals comprises performing at least one of a time difference of arrival (TDOA) calculation or a time of arrival (TOA) calculation.

9. The method of claim 1, further comprising:
   determining, by the at least one processor of the self-shopping platform, at least a two-dimensional position of the self-shopping terminal based at least in part on the ranging values determined by each of the plurality of reader processors which received the ultra-wideband signals.

10. The method of claim 9, further comprising:
    selecting, by at least one processor, a message based at least in part on the determined position of the self-shopping terminal; and
    sending, by the at least one processor, the selected message to the self-shopping terminal over at least one data communication channel.

11. The method of claim 10 wherein sending the selected message to the self-shopping terminal over at least one communication channel comprises sending the selected message to the self-shopping terminal over the first wireless communication channel.

12. The method of claim 1 wherein the self-shopping platform further includes the associated self-shopping terminals, wherein the selected self-shopping terminal being associated with a consumer and having one or more processors, at least one wireless communications transceiver communicatively coupled to the one or more processors of the selected self-shopping terminal, the ultra-wideband tag communicatively coupled to the one or more processors of the selected-self shopping terminal, and at least one non-transitory processor-readable medium communicatively coupled to the one or more processors of the selected self-shopping terminal and which stores at least one of processor-executable instructions or data, the method comprising:
    receiving, by the at least one wireless communications transceiver of the selected self-shopping terminal, the activation command over the wireless communication channel, the first wireless communication channel comprising at least one of an IEEE 802.11 communication channel or an ultra-high frequency radio frequency identification (UHF-RFID) communication channel; and
    in response to the received activation command, causing, by the one or more processors of the selected self-shopping terminal, a transmission of ultra-wideband signals by an ultra-wideband backscatter circuit of the ultra-wideband tag of the selected self-shopping terminal.

13. The method of claim 12 wherein receiving an activation command comprises receiving an activation command addressed to an internet protocol (IP) address of the selected self-shopping terminal.

14. The method of claim 12 wherein causing a transmission of ultra-wideband signals by the ultra-wideband tag of the selected self-shopping terminal comprises causing a transmission of ultra-wideband signals by an active ultra-wideband transmitter of the ultra-wideband tag.

15. The method of claim 12 wherein causing a transmission of ultra-wideband signals by the ultra-wideband tag of the selected self-shopping terminal comprises causing a transmission of code division multiple access (CDMA) ultra-wideband signals from the ultra-wideband tag of the selected self-shopping terminal.

16. The method of claim 15 wherein causing a transmission of CDMA ultra-wideband signals by the ultra-wideband tag of the selected self-shopping terminal comprises causing a transmission of CDMA ultra-wideband signals that use a balanced spreading code.

17. The method of claim 12, further comprising:
receiving, by the at least one wireless communications transceiver of the selected self-shopping terminal, a marketing message from at least one of the plurality of readers over the first wireless communication channel.

18. The method of claim 1, further comprising:
subsequent to the selecting of one of a plurality of self-shopping terminals associated with the self-shopping platform, selecting, by at least one processor, another self-shopping terminal of the plurality of self-shopping terminals associated with the self-shopping platform;
sending, by the at least one processor, an activation command to the selected other self-shopping terminal over the first wireless communication channel, the first wireless communication channel utilizing wireless signals other than ultra-wideband signals;
in response to the sending of the activation command to the selected other self-shopping terminal, receiving, by the plurality of reader processors of the respective plurality of readers, ultra-wideband signals from an ultra-wideband tag of the selected other self-shopping terminal; and
determining, by each of the plurality of reader processors of the respective plurality of readers which receive the ultra-wideband signals from the ultra-wideband tag of the selected other self-shopping terminal, a ranging value indicative of a distance between the other self-shopping terminal and the respective reader using the received other ultra-wideband signals.

19. A self-shopping system, comprising:
a processor-based locator system;
a plurality of readers fixedly positioned within a shopping environment, each of the plurality of readers coupled to the processor-based locator system over at least one data communication channel and comprising:
at least one reader processor;
a first wireless communication transceiver communicatively coupled to the at least one reader processor, the wireless communications transceiver including a first transmitter that sends data over a first wireless communication channel and a first receiver that receives data over the first wireless communication channel, the first communication channel utilizing signals other than ultra-wideband signals;
a second receiver communicatively coupled to the at least one reader processor, the second receiver receives ultra-wideband signals; and
at least one nontransitory processor-readable medium communicatively coupled to the at least one reader processor and which stores at least one of processor-executable instructions or data that when executed by the at least one reader processor, cause the at least one reader processor to:
send, by the first transmitter, an activation command to a selected one of a plurality of self-shopping terminals over the first wireless communication channel;
receive, by the second receiver, ultra-wideband signals from an ultra-wideband tag of the selected self-shopping terminal;
determine a ranging value indicative of a distance between the self-shopping terminal and the respective reader using the received ultra-wideband signals; and
send the respective determined ranging value to the processor-based locator system over the at least one data communication channel.

20. The self-shopping system of claim 19 wherein the at least one reader processor:
selects an internet protocol (IP) address of one of the plurality of self-shopping terminals.

21. The self-shopping system of claim 19 wherein the at least one reader processor:
sends an activation command to the selected self-shopping terminal over at least one of an IEEE 802.11 communication channel or an ultra-high frequency radio frequency identification (UHF-RFID) communication channel.

22. The self-shopping system of claim 19 wherein the at least one reader processor:
receives, by the second receiver, ultra-wideband signals from an active ultra-wideband transmitter of the ultra-wideband tag.

23. The self-shopping system of claim 19 wherein the at least one reader processor:
receives, by the second receiver, ultra-wideband signals from an ultra-wideband backscatter circuit of the ultra-wideband tag.

24. The self-shopping system of claim 19 wherein the at least one reader processor:
receives code division multiple access (CDMA) ultra-wideband signals from an ultra-wideband tag of the selected self-shopping terminal.

25. The self-shopping system of claim 24 wherein the CDMA ultra-wideband signals received from an ultra-wideband tag comprise CDMA ultra-wideband signals that use a balanced spreading code.

26. The self-shopping system of claim 19 wherein the at least one reader processor:
performs at least one of a time difference of arrival (TDOA) calculation or a time of arrival (TOA) calculation.

27. The self-shopping system of claim 19 wherein the processor-based locator system determines at least a two-dimensional position of the self-shopping terminal based at least in part on the ranging values determined by each of the plurality of reader processors which received the ultra-wideband signals.

28. The self-shopping system of claim 27, further comprising:
a processor-based messaging system that select a message based at least in part on the determined position of the self-shopping terminal, and sends the selected message to the self-shopping terminal over at least one data communication channel.

29. The self-shopping system of claim 28 wherein the processor-based messaging system sends the selected message to the self-shopping terminal over the first wireless communication channel.

30. The self-shopping system of claim 19, further comprising, the selected self-shopping terminal, wherein the selected self-shopping terminal comprising: one or more processors;
one or more wireless communications transceivers communicatively coupled to the one or more processors of the selected-self shopping terminal;
the ultra-wideband tag communicatively coupled to the one or more processors of the selected self-shopping terminal, the ultra-wideband tag comprising an ultra-wideband backscatter circuit; and
one or more non-transitory processor-readable media communicatively coupled to the one or more processors of the selected self-shopping terminal and which stores one or more of processor-executable instructions or data that when executed by the one or more processors of the selected self-shopping terminal, cause the one or more processors of the selected self-shopping terminal to:
receive, by the one or more wireless communications transceivers of the selected-self shopping terminal, the activation command over the wireless communication channel, the first wireless communication channel comprising at least one of an IEEE 802.11 communication channel or an ultra-high frequency radio frequency identification (UHF-RFID) communication channel; and in response to the received activation command, cause a transmission of ultra-wideband signals by the ultra-wideband backscatter circuit of the ultra-wideband tag of the selected self-shopping terminal.

31. The self-shopping system of claim 30 wherein the one or more processors of the selected self-shopping terminal:
receives, by the one or more wireless communications transceivers of the selected self-shopping terminal, an activation command addressed to an internet protocol (IP) address of the selected self-shopping terminal.

32. The self-shopping system of claim 30 wherein the ultra-wideband tag comprises an active ultra-wideband transmitter that transmits the ultra-wideband signals.

33. The self-shopping system of claim 30 wherein the ultra-wideband tag transmits code division multiple access (CDMA) ultra-wideband signals.

34. The self-shopping system of claim 33 wherein the ultra-wideband tag transmits code division multiple access (CDMA) ultra-wideband signals that use a balanced spreading code.

35. The self-shopping system of claim 30 wherein the self-shopping terminal comprises one of a smartphone, a tablet computer or a notebook computer.

36. The self-shopping system of claim 30 wherein the one or more processors of the selected self-shopping terminal:
receives, by the one or more wireless communications transceivers of the selected self-shopping terminal, a marketing message from at least one of the plurality of readers over the first wireless communication channel.

37. The self-shopping system of claim 19 wherein the at least one reader processor, subsequent to sending an activation command to a selected one of a plurality of self-shopping terminals over the first wireless communication channel:
sends, by the first transmitter, an activation command to another selected self-shopping terminal of the plurality of self-shopping terminals over the first wireless communication channel;
receives, by the second receiver, ultra-wideband signals from an ultra-wideband tag of the other selected self-shopping terminal; and
determines a ranging value indicative of a distance between the other self-shopping terminal and the respective reader using the received ultra-wideband signals from the ultra-wideband tag of the other selected self-shopping terminal.

* * * * *